(12) United States Patent
Fahrbach

(10) Patent No.: US 12,650,584 B2
(45) Date of Patent: Jun. 9, 2026

(54) METHOD, OPTICAL APPARATUS AND RETROFIT KIT FOR PRODUCING LIGHT SHEETS BY MEANS OF A RETROREFLECTOR

(71) Applicant: LEICA MICROSYSTEMS CMS GMBH, Wetzlar (DE)

(72) Inventor: Florian Fahrbach, Wetzlar (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 518 days.

(21) Appl. No.: 18/041,227

(22) PCT Filed: Aug. 12, 2021

(86) PCT No.: PCT/EP2021/072502
§ 371 (c)(1),
(2) Date: Feb. 10, 2023

(87) PCT Pub. No.: WO2022/034174
PCT Pub. Date: Feb. 17, 2022

(65) Prior Publication Data
US 2023/0314780 A1 Oct. 5, 2023

(30) Foreign Application Priority Data
Aug. 14, 2020 (DE) ..................... 10 2020 210 369.0

(51) Int. Cl.
*G02B 21/00* (2006.01)
*G02B 21/36* (2006.01)

(52) U.S. Cl.
CPC ..... *G02B 21/0032* (2013.01); *G02B 21/0076* (2013.01); *G02B 21/367* (2013.01)

(58) Field of Classification Search
CPC G02B 21/0032; G02B 21/0076; G02B 21/06; G02B 21/361; G02B 21/32; G02B 21/0048; G01N 21/6458
See application file for complete search history.

(56) References Cited

U.S. PATENT DOCUMENTS

| | | |
|---|---|---|
| 11,048,078 B2 | 6/2021 | Fahrbach et al. |
| 2015/0177506 A1 | 6/2015 | Nishiwaki |
| 2018/0203217 A1 | 7/2018 | Knebel et al. |

FOREIGN PATENT DOCUMENTS

| | | |
|---|---|---|
| EP | 3081975 A1 | 10/2016 |
| JP | 2019/523456 A | 8/2019 |

(Continued)

OTHER PUBLICATIONS

Jan Huisken et al., Even fluorescence excitation by multidirectional selective plane illumination microscopy (mSPIM), Optics Letters, Sep. 2007,pp. 2608-2610, vol. 32 No. 17, Optical Society of America, California, United States.

*Primary Examiner* — Brandi N Thomas
(74) *Attorney, Agent, or Firm* — LEYDIG, VOIT & MAYER, LTD.

(57) ABSTRACT

An optical apparatus for production of light sheets includes an optical splitter system which, at an optical splitter system output, includes a plurality of collimated light beams converging on a common point; a retroreflector, including a beam input at which the plurality of light beams are coupled into the retroreflector, and a beam output at which the plurality of light beams are emitted from the retroreflector; and a light sheet optical system into which the plurality of light beams emitted from the beam output of the retroreflector extend. At a light sheet optical system output, a differently oriented light sheet is formed from each light beam. A path length covered within the retroreflector by the plurality of light beams between the beam input and the (Continued)

beam output is dependent on an angle of incidence of each light beam at the beam input.

16 Claims, 3 Drawing Sheets

(56)                    References Cited

FOREIGN PATENT DOCUMENTS

| WO | WO 2017013054 | A1 | 1/2017 |  |
| WO | WO 2020063895 | * | 4/2020 | .......... G02B 21/367 |
| WO | WO 2020063895 | A1 | 4/2020 |  |

* cited by examiner

METHOD, OPTICAL APPARATUS AND RETROFIT KIT FOR PRODUCING LIGHT SHEETS BY MEANS OF A RETROREFLECTOR

CROSS REFERENCE TO RELATED APPLICATIONS

This application is a U.S. National Phase application under 35 U.S.C. § 371 of International Application No. PCT/EP2021/072502, filed on Aug. 12, 2021, and claims benefit to German Patent Application No. DE 10 2020 210 369.0, filed on Aug. 14, 2020. The International Application was published in German on Feb. 17, 2022 as WO 2022/034174 A1 under PCT Article 21(2).

FIELD

The invention relates to a method and an optical apparatus for producing light sheets, as they are used, for example, in light sheet microscopy.

BACKGROUND

A light sheet can be produced by focusing a light beam, in particular a laser beam, in only one spatial direction. This type of focusing results in a light sheet which illuminates only a thin layer of a specimen. The thickness of a light sheet is typically between about a few hundred nanometers and several micrometers.

To scan the specimen or to avoid shadowing, a plurality of differently oriented light sheets is produced. To do this, generally mechanisms comprising moveable elements, such as comprising moveable mirrors, are used. These mechanisms are expensive, troublesome to adjust and susceptible to failure.

It is therefore desirable to provide an apparatus and methods allowing light sheets to be easily produced and which are not subject to wear.

SUMMARY

In an embodiment, the present disclosure provides an optical apparatus for production of light sheets. The optical apparatus includes an optical splitter system which, at an optical splitter system output thereof, includes a plurality of collimated light beams converging on a common point, a retroreflector, including a beam input at which the plurality of light beams are coupled into the retroreflector, and a beam output at which the plurality of light beams are emitted from the retroreflector, and a light sheet optical system into which the plurality of light beams emitted from the beam output of the retroreflector extend. At a light sheet optical system output, a differently oriented light sheet is formed from each light beam of the plurality of light beams. A path length covered within the retroreflector by the plurality of light beams between the beam input and the beam output is dependent on an angle of incidence of each light beam of the plurality of light beams at the beam input.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
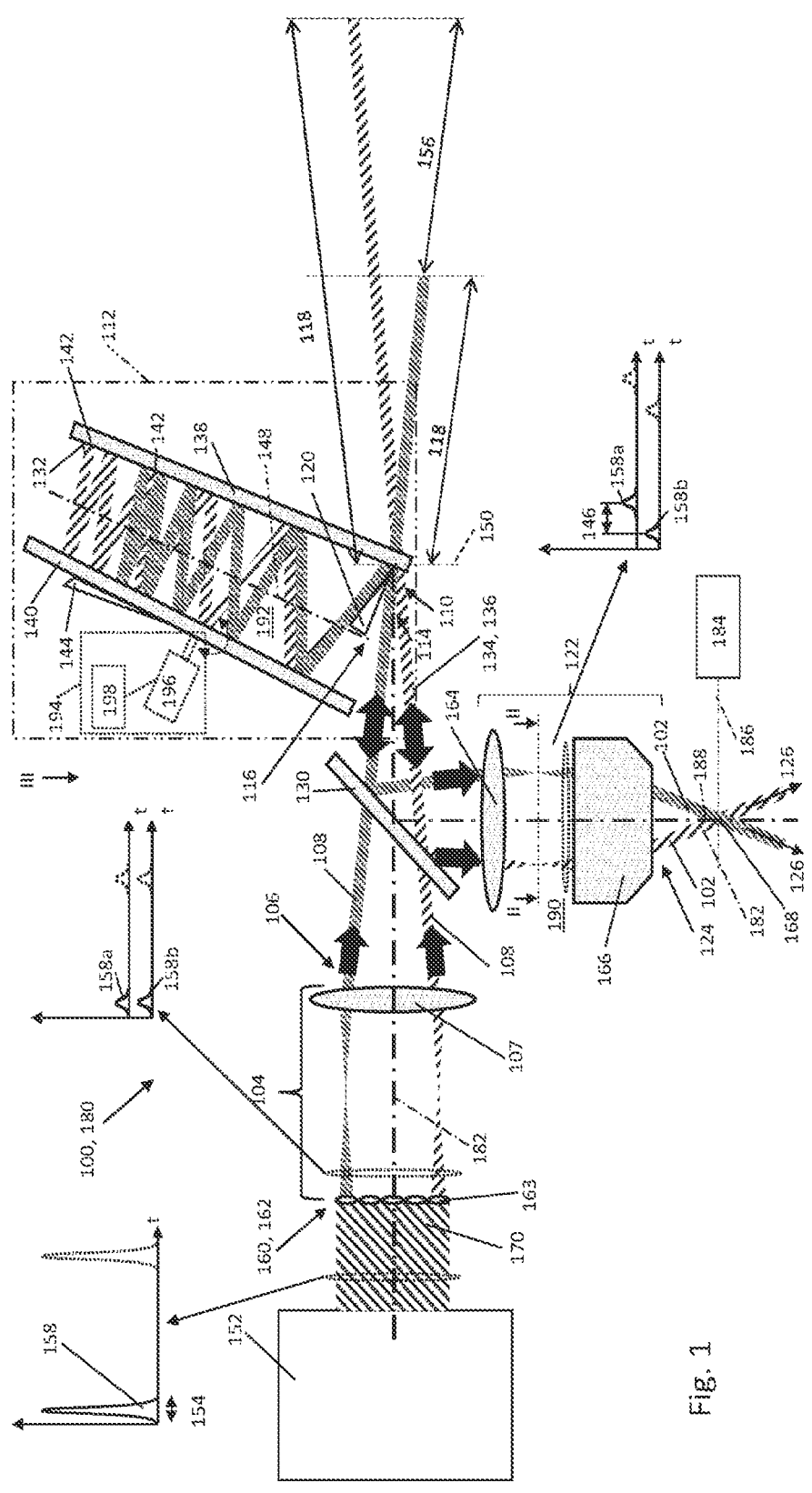
FIG. 1 is a schematic view of an embodiment of an optical apparatus.

According to an aspect of the present invention, an apparatus and methods allowing light sheets to be easily produced and which are not subject to wear are enabled by an optical apparatus for producing light sheets, comprising an optical splitter system including, at its output, a plurality of collimated light beams which converge on a single point, comprising a retroreflector including a beam input at which the light beams are coupled into the retroreflector and a beam output at which the light beams are emitted from the retroreflector, wherein the path length covered by the light beams within the retroreflector between the beam input and the beam output is dependent on the angle of incidence of each light beam at the beam input, and comprising a light sheet optical system into which the light beams emitted by the beam output of the retroreflector extend, wherein a differently oriented light sheet is formed from each light beam at the output of the light sheet optical system.

According to a further aspect of the present invention, a retrofit kit for a light sheet microscope is provided, comprising an optical splitter system, including, at its output, a plurality of collimated light beams which converge on a single point, comprising a retroreflector including a beam input at which the light beams are coupled into the retroreflector and a beam output at which the light beams are emitted from the retroreflector, wherein the path length covered by the light beams within the retroreflector between the beam input and the beam output is dependent on the angle of incidence of the light beam at the beam input, and wherein the retrofit kit is configured to be arrangeable in the illumination beam path of the light sheet microscope.

Moreover, a method of producing light sheets is provided, and in a preferred aspect using the above-mentioned optical apparatus, wherein a plurality of collimated light pulses converging on a common point are coupled into a retroreflector and cover a path length within the retroreflector dependent on the angle of incidence into the retroreflector, before they are coupled out of the retroreflector and are each transformed into one light sheet.

Such an optical apparatus, such a retrofit kit and such a method can allow the production of a plurality of light sheets without the use of mechanisms subject to wear.

Herein, it is advantageous that the light beams are collimated within the retroreflector so that light sheets can be sharply focused even with long paths. Thanks to the collimated light beams converging on a single point, generally used light sheet optical system can be used to produce the light sheets. The path length dependent on the angle of incidence, in particular, enables it to be used with pulsed light sources, because the different path lengths cause differences in delay and thus generate light sheets produced at different points in time. This can be used to generate incoherent light sheets from light beams still coherent upstream of the retroreflector, or to produce light sheets offset in time and space, for example in a depth direction. Overall, this results in an apparatus which can produce a plurality of light sheets instantaneously and in an exclusively optical manner, and thus free of wear.

A light beam in the above-mentioned sense, in the context of the beam optics, is a beam path of the optical apparatus or of the retrofit kit, or is an optical axis along which a (collimated) ray bundle moves without the need for a photon beam or an electromagnetic wave, which moves along the light beam, being present in the concrete sense. Beam path and light beams are also present at times when the optical apparatus is not in operation. Since light moves along the light beams the term "light beam" will be used in the following both for the beam path and for the light moving along the beam path.

Aspects of the present invention can be further improved by the following features, each of which is advantageous in itself, independently from each other and randomly combinable with each other. Each feature can be used regardless both for the optical apparatus, the retrofit kit and the method.

According to a first advantageous embodiment, the light beams, in particular all of the light beams, can have path lengths that are different from each other within the retroreflector.

It is further advantageous for each light beam to have a different angle of incidence at which it enters into the retroreflector. The angle of incidence is the angle between the light beam and the normal onto the mirror surface of the retroreflector onto which the light beam impinges.

To ensure that each light beam of the light beams converging on a single point covers a different path length within the retroreflector, the path length of a light beam within the retroreflector can be a strictly monotonic function of the angle of incidence. The path length can thus be the shorter, the smaller the angle of incidence.

These three measures independently of each other cause, due to the different path lengths, that each light beam enters the light sheet optical system at a different point in time and thus becomes identifiable both with respect to its position and orientation relative to the optical axis, and with respect to its phase position, and can thus be used for the production of certain light sheets in a controlled manner.

In a further advantageous embodiment, it can be provided for the light beams to extend at the same angle relative to each other at the beam output as at the beam input. This includes the two possibilities that the light beams converge on the common point and that the light beams fan out from the common point. Both options have the advantage that the relative extension of the light beams with respect to each other is not negatively affected by the retroreflector. In particular, that portion of the light beams directed toward the light sheet optical system can originate from the common point.

In an embodiment, the optical apparatus, or the retrofit kit, are used for the production of light sheets which overlap in such a manner that shadowing by the specimen is reduced or even entirely eliminated. In this context, it is advantageous for the light sheets produced from the different light beams to have different propagation directions. Alternatively, or cumulatively, the light sheets can be coplanar.

Individual, and in a preferred embodiment all, of the light beams can extend at least in part between the optical splitter system and the light sheet optical system within the same plane, thus extending in a manner coplanar to each other. In a particular embodiment, the light beams extend directly upstream (thus on the side of the light source) from the light sheet optical system juxtaposed in one direction or plane, which is parallel to the spatial direction in which the light beams are focused by a cylindrical lens, for example, of the light sheet optical system. In this way, in cooperation with an objective of the light sheet optical system, coplanar light sheets are produced having different orientations.

The light beams should also be collimated at the beam output so that the foci of the light sheets are not at different distances from the objective.

A compact construction can be achieved by having the beam input and the beam output coincide therefore having the light beams enter into the retroreflector at the same place as where they are emitted from the retroreflector. In such a construction, a beam splitter can be provided between the beam output and the light sheet optical system. Light beams leaving the retroreflector are, in a preferred embodiment, redirected from the beam splitter to the light sheet optical system. Light beams directed towards the beam input can extend through the beam splitter.

According to a further advantageous embodiment, the common point can coincide with the beam input. This allows the dimensions of the beam input to be kept small. The common point can lie, in a particular embodiment, on a mirror surface of the retroreflector. The common point is, in a preferred embodiment, on the optical axis of the optical splitter system which preferably coincides with the optical axis of the light sheet optical system.

For a compact construction of the optical apparatus or the retrofit kit it is advantageous if for at least some of the light beams a portion of the light beam entering into the retroreflector which ends at the beam input and a portion of the same being emitted from the retroreflector and originating from the beam output are coincident.

According to a particularly simple and compact construction, the retroreflector can have two mirrors which are planar and/or tilted with respect to each other by only one spatial direction. The light beams can have a point of reversal in the retroreflector, at which the propagation direction of the light beams is reversed. In this embodiment, the light beams are reflected within the retroreflector up to the point of reversal first away from the beam input and then reflected back to the beam input from the point of reversal. The mirrors can be spaced at each point. The mirrors are, in a preferred embodiment, spaced less at the point of reversal than at the beam input and/or at the beam output. To keep the structural size small, the beam input and the beam output can be arranged at the same end of the retroreflector. The point of reversal is spaced from the beam input and beam output in the direction of the other end. The distance of the point of reversal from the beam input and/or beam output can be dependent on the angle of incidence of the light beam.

To create path lengths or path length distances within the retroreflector that are as large as possible, the angle by which the mirrors are tilted with respect to each other is, in a preferred embodiment, smaller than the angle between the light beams that are farthest apart. For example, the angle, by which the mirrors are tilted with respect to each other can be smaller than $10^{-2}$ rad and/or larger than $10^{-4}$ rad. In another embodiment, the angle by which the mirrors are tilted with respect to each other is smaller than 10 degrees or smaller than 5 degrees. The angle by which the mirrors are tilted with respect to each other determines the path length difference between the light beams within the retroreflector. The path length difference and thus the angle by which the mirrors are tilted with respect to each other will be adjusted in most cases in dependence on the coherence length of the light of the light source.

In accordance with another embodiment, it can be provided that the angle of incidence of at least some, preferably of all of the light beams, is a different integer multiple of the angle by which the mirrors are tilted with respect to each other. In such an embodiment, the light beams incident into the retroreflector at the beam input and emitted from the retroreflector at the beam output extend in a coincident manner.

The optical apparatus or the retrofit kit can have an, and in a particular embodiment motorized, adjustment device which is configured to vary the angle between the mirrors. To control the adjustment device, an electronic control unit can be provided. The adjustment device can include a drive element, for example a motor or another type of actuator, acting on at least one mirror. The adjustment device allows the relative position and/or orientation and/or the light beams incident into the light sheet optical system and/or the path length and/or the path length differences within the retroreflector to be adapted to each particular requirement. For example, the angle by which the two mirrors of the retroreflector are tilted with respect to each other can be automatically varied by means of the adjustment device in dependence on the coherence length of the light of the light beams, on a spectrum of the light of the light beams and/or on the number, orientation and/or position of the light sheets to be created.

The retroreflector can include a volume filled with a gaseous medium or containing a vacuum between the two mirror surfaces, which can be sealed off towards the outside. Alternatively, the light beams in the retroreflector can also extend through glass. For example, the retroreflector can be made of glass, in particular a block of glass, for example in a monolithic construction. Mirrors can be applied to two opposite surfaces of the block of glass, or two opposite surfaces of the block of glass can be mirrored.

The common point on which the light beams converge is, in a preferred embodiment, in a backside (light source-side) focal plane, or a plane optically conjugate with respect thereto, of the light sheet optical system, in particular a cylindrical lens of the light sheet optical system. The cylindrical lens can be situated on the end of the light sheet optical system facing the retroreflector, thus at the input thereof. The cylindrical lens can be situated between the reflector and a microscope objective.

The optical apparatus and the retrofit kit can be used to create the light sheets from light beams originally coherent with each other and to overlap them in an interference-free and coplanar manner. Such overlap can be useful, for example, to avoid shadowing. This can be achieved according to an advantageous embodiment by making the shortest difference between the path lengths of different light beams larger than the coherence length of the light of the light beams. To avoid shadowing, the light sheets are, in a preferred embodiment, coplanar.

The light source can be part of the optical apparatus.

It is also advantageous to design the light source in such a way that it generates light pulses, or to provide a light source that is a pulsed light source. In this embodiment, due to the different path lengths in the retroreflector, the optical apparatus, in particular the retroreflector, is configured to generate light pulses that succeed each other in time along the light beams at the beam output from originally synchronous light pulses along the light beams at the beam input. The time difference between successive light pulses results from the path length difference within the retroreflector. The light sheet optical system is configured to generate light sheets succeeding each other in time from light pulses succeeding each other in time and propagating along the light beams. The light pulses along different light beams are offset in time at the beam output of the retroreflector. The light sheets are thus generated from light pulses arriving at the light sheet optical system one after the other. This measure allows scanning of a specimen with the aid of successive light sheets without the need for mechanisms susceptible to failure.

The light source is, in a preferred embodiment, a laser, for example a gas laser or a diode laser.

The optical splitter system can be configured to split an input beam, for example a laser beam, into the light beams. For example, the optical splitter system can include an, in a particular embodiment, line-shaped lens assembly, in particular a micro lens assembly and/or one or more beam splitters, such as gratings or partially transmitting mirrors, which can also be arranged in cascade fashion. The lenses of the lens assembly can be cylindrical lenses. The use of cylindrical lenses in the optical splitter system is not necessary if the light sheet optical system includes a cylindrical lens.

At the output of the splitter system the light beams are, in a preferred embodiment, juxtaposed in a single plane.

The optical splitter system can include, at its output, a lens or a lens system through which the light beams extend and which ensures collimation of the light beams and which deflects the individual light beams towards the optical axis depending on their distance so that they extend through the common point on the optical axis.

To produce collimated light beams the optical splitter system can include a collimating device.

The optical apparatus in one of the above-described embodiments, can be part of a microscope and, in a particular embodiment, can be arranged within the illumination beam path. The microscope can have a detector optical system the optical axis of which is, in a preferred embodiment, aligned perpendicular to the plane of the light sheets produced by the light sheet optical system.

In a further embodiment, the microscope can include a light source which is configured to generate light having a predetermined coherence length, wherein the light beams are produced from the light of the light source.

The invention will be explained in the following in an exemplary manner with reference to an embodiment with reference to the drawings. Features corresponding to each other in terms of structure and/or function will be designated using the same reference numerals in the description and the drawings.

In accordance with the above explanations, individual features implemented in the exemplary embodiment can be omitted if the technical effect is not essential for a particular application. By the same token, features from the above description of the exemplary embodiment can be added if the technical effect linked to these features should be essential for a particular application.

The structure and function of an optical apparatus 100 will be explained in the following with reference to FIGS. 1 to 3.

The optical apparatus 100 is useful for the production of a plurality of light sheets 102. In a preferred embodiment, the optical apparatus 100 is for the production of coplanar and incoherent light sheets 102 having different propagation directions 126, from light beams 108, in particular light pulses 158, 158a, 158b. For this purpose, one light sheet 103 is generated from each light beam 108. Alternatively, the optical apparatus 100 can also be used to produce parallel and spaced light sheets 102 from the light beams 108.

The optical apparatus 100 includes an optical splitter system 104 including a plurality of collimated light beams 108 at its output 106, which converge on a common point 110. A light beam 108 represents an optical axis along which a collimated ray bundle moves. The light beams are, in a preferred embodiment, juxtaposed in a single plane at the output of the optical splitter system at which they leave the optical splitter system towards the retroreflector 112.

At its output 106, the optical splitter system 104 can have a lens 107, which ensures that the light beams 108 leaving the optical splitter system 104 toward the retroreflector 112 are collimated and converge on the point 110.

The optical apparatus 100 further includes a retroreflector 112. At a beam input 114 of the retroreflector 112, the light beams 108 are coupled into the retroreflector 112. At a beam output 116, the light beams 108 are emitted from the retroreflector 112. Between the beam input 114 and the beam output 116, the light beams cover a path length 118 within the retroreflector which is dependent on the angle of incidence 120 of each light beam at the beam input 114.

FIG. 1 shows two light beams in an exemplary manner. However, the number of light beams 108 can be any number and depends, for example, on each purpose of use of the optical apparatus 100 and the number of light sheets 102 needed. The path lengths 118 are shown in FIG. 1 to the right of the retroreflector 112 in a developed manner to more easily compare their path lengths. In fact, the path length 118 is determined by the zig-zag-shaped beam path of each light beam 108 within the retroreflector 112.

The optical apparatus 100 further includes a light sheet optical system 122 into which the light beams 108 extend from the beam output 116 of the retroreflector 112. The light sheet optical system 122, at its output 124, produces differently oriented light sheets 102 from the light beams 108.

The optical apparatus 100 can be part of a light sheet microscope 180 and can form, for example, an illumination beam path 182 of the light sheet microscope 180, or can be arranged in the illumination beam path.

The optical apparatus 100 can also be configured as a retrofit kit for a light sheet microscope 180 which has not been provided with an optical apparatus 100. The retrofit kit comprises the optical apparatus 100 or its components yet to be assembled, and is configured to be arrangeable in the illumination beam path 182 of the light sheet microscope.

The light sheet microscope 180 can also be equipped with a detector optical system 184 the optical axis 186 of which is oriented perpendicular to the optical axis 188 of the light sheet optical system 122.

The optical apparatus 100 can have a light source 152. The light source 152 can be a pulsed light source which produces light pulses 158. For example, the light source can be a laser, such as a gas laser or a diode laser.

The light source 152, in a preferred embodiment, generates light having a coherence length 154 depending on the structure and/or the operating mode of the light source.

The optical splitter system 104, in the variant shown, is configured to produce a plurality of light beams 108 from one input light beam 170. To do this, an optical device 160 for splitting up the light beams can be provided, in particular, for example a line-shaped lens assembly 162, such as a micro lens assembly, and/or an assembly of beam splitters, such as gratings or partially transmitting mirrors. The beam splitters can also be arranged in a cascade fashion. FIG. 1 only shows a micro lens assembly in an exemplary manner. The lenses 163 of the lens assembly 162 can be cylindrical lenses. In this case, the light beams are focused in the drawing plane and are collimated perpendicular thereto.

When the lenses 163 of the lens assembly 162 are cylindrical lenses, the use of a single lens 107 would focus the beams collimated perpendicular to the drawing plane (approximately onto point 110), which is undesirable. This is why, in this case, advantageously an additional (cylindrical) lens or an assembly of (cylindrical) lenses can be provided on the source side of the lens 107, which focus in the direction perpendicular to the drawing plane into the backside (light-source side) focal plane of the lens 107, however, more strongly than the lens assembly 162 or its lenses 163 focus in the drawing plane, to create a light sheet in the specimen.

If a light pulse 158 is generated by the light source 152 along the input light beam 170, it is split by the optical apparatus 160 into different light pulses 158a, 158b, which can be synchronous with respect to each other, in particular, and propagate along the different light beams 108.

Figures 2, 3:
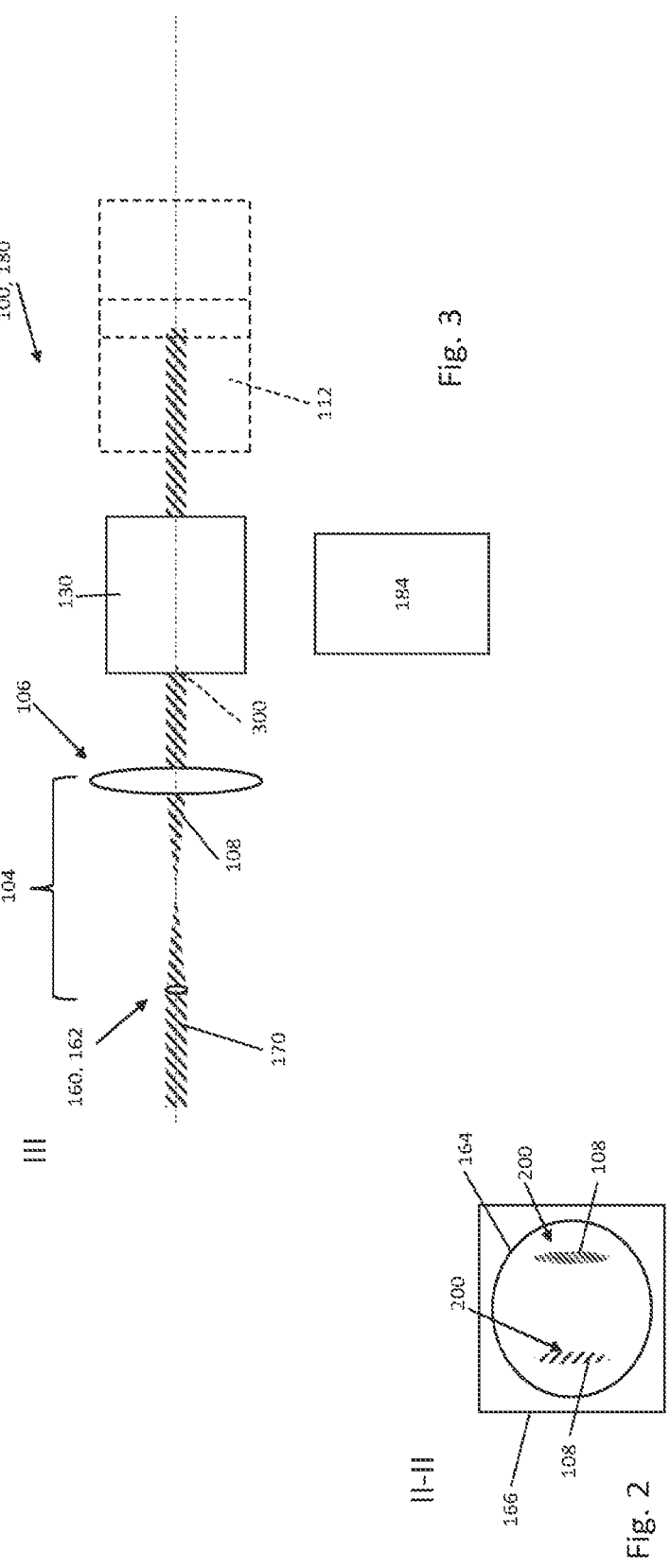
FIG. 2 is a schematic view of the optical apparatus in the viewing direction II-II of FIG. 1.
FIG. 3 is a schematic view of the optical apparatus of FIG. 1 along arrow III.

As can be seen from FIGS. 1 and 3, the individual light beams 108 are juxtaposed in a single plane 300 which, in FIG. 3, is perpendicular to the drawing plane and is indicated by a dashed line, at least in sections, preferably over the entire illumination beam path 182, but at least upstream of the entry into the light sheet optical system 122. In particular, between the beam output 116 of the retroreflector 112 and the light sheet optical system 122 the light beams 108 are also in a single plane, preferably in plane 300, or also in a plane rotated with respect thereto.

The light sheet optical system 122 has a back focal plane 150, or a plane optically conjugate thereto, in which the point 110 lies on which the collimated light beams 108 produced by the optical splitter system 104 converge.

The light sheet optical system 122 can have a cylindrical lens 164. The point 110 can be situated, in particular, in the back focal plane 150, or a plane optically conjugate thereto, of this cylindrical lens 164.

Furthermore, the light sheet optical system 122 can include an objective 166, which can also be termed a microscope objective. In a pupil 200 (FIG. 2) of the objective 166, the light beams 108 are juxtaposed. The light propagating along the light beams 108 has an elliptical cross-section 202 in the pupil 200 on each light beam 108.

The light sheets 102 produced by the light sheet optical system 122 intersect. In a preferred embodiment, the light sheets 102 are arranged to be coplanar to each other and have different propagation directions 126. The propagation directions 126 of the light sheets 102 are thus in a common plane. The light sheets, in a preferred embodiment, intersect in a specimen volume 168, which can lie, in particular, on the optical axis 186 of the detector optical system 184. This is the case, for example, when the plane 300 extends parallel to a plane 190 in which the cylindrical lens 164 is focused. In FIG. 1, this is the drawing plane.

The cylindrical lens 164 produces cylindrical foci, as shown in FIG. 2. The elliptical cross-section of the foci is rotated by 90 degrees as it is transmitted by the objective 166. The light sheets are then superimposed and are more strongly focused in the direction along the long axes of the ellipses, are therefore thinner. This can also be described by the fact that in the back focal plane of the objective, thus on the side of the light source, a plurality of light sheets having elliptical cross-section are parallel with respect to each other. The ellipses are rotated by 90 degrees after transmission through the objective 166 and are then superimposed in the focal plane of the objective.

By the provision of coplanar and pivoted light sheets 102, strip artifacts are avoided, which are produced by shadowing and refraction of a light sheet due to objects in the specimen volume 168. The specimen volume 168 is illuminated from different angles, but in a coplanar manner by the light sheets 102 so that shadowing is minimized.

With overlapping light sheets 102 it should be considered that the individual light sheets 102 are incoherent with respect to each other to avoid interferences. This is achieved simply by providing that the smallest path length difference 156 between all of the light beams 108 used to produce light sheets 102 is larger than the coherence length 154 of the light of the light beams 108.

For example, if the light source 152 produces a succession in time, t, of input light pulses 158 having a coherence length 154, the individual light pulses 158a, 185b used for the production of light sheets 102 into which an input light pulse 158 is split by the optical splitter system 104, should be spaced from each other in time by at least one coherence length 154.

The retroreflector 112 thus has the function of producing, at the beam output 116, light beams 108 incoherent to each other from light beams 108 coherent with each other at the beam input 114.

This is achieved by the fact that the light beams 108 are coupled into the retroreflector 112 at different angles of incidence 120 and the path length 118 within the retroreflector 112 is dependent on the angle of incidence 120. The retroreflector 112 therefore transforms a difference in angle of incidence 120 into a path length difference 156. The light propagated along the light beams 108 is incoherent if all of the path length differences 156 between the light beams 108 within the retroreflector 112 are larger than the coherence length 154.

Basically, the retroreflector 112 can have any particular structure, for example as a triple mirror or triple prism, as a cat's eye or as a Luneburg lens. In a preferred embodiment, however, for the retroreflector to have a design that produces large path length differences 156 between adjacent light beams even with small variations of the angles of incidence between these light beams. In another preferred embodiment, the angle ratios existing at the beam input 114 between the individual collimated light beams are maintained also at the beam output 116. The retroreflector 112 should thus not vary the relative position and orientation of the individual light beams 108 with respect to each other. Finally, it would be advantageous if the beam input 114 was not far removed from the beam output 116 of the retroreflector 112 to thus continue to enable a compact structure.

The exemplary retroreflector 112 shown in FIG. 1 fulfills these requirements.

The retroreflector 112, in the exemplary embodiment shown includes two planar mirrors 138, 140 tilted with respect to each other from the parallel position by an angle 144, in a preferred embodiment, between $10^{-4}$ rad and $10^{-2}$ rad. Angles of less than 10 degrees or less than 5 degrees are also possible. The axis about which the two mirrors 138, 140 are tilted with respect to each other is perpendicular to the plane 300 and extends in parallel to the mirror planes. The volume 192 between the two mirrors can be filled with gas or air and can be sealed off towards the outside. Alternatively, the retroreflector 112 can also be made of a block of glass so that the light beams 108 extend through glass within the retroreflector 112. In this case, the mirrors 138, 140 are formed by two opposite surfaces of the block of glass tilted with respect to each other.

The beam path 114, in the exemplary embodiment shown, is on the surface 132 of a mirror 138. A middle plane 148 between and at equal distances from the two opposite mirrors 138, 140 is perpendicular to the plane 300 and extends obliquely to the illumination beam path 182.

The point 110 on which the collimated light beams 108 converge can be upstream of or within the retroreflector 112. In the embodiment shown in FIG. 1, the point 110 is on the mirror surface 132, thus at the beam input 114. This is also the place where the beam output is to be found.

FIG. 1 schematically shows the beam paths of two light beams 108 within the retroreflector 112.

The light beams 108 are reflected back and forth between the two mirrors 138, 140. Since the distance of the two mirrors gets smaller in the direction leading away from the beam input, the light beams 108 are reflected away from the beam input into the reflector 112. In the process, the angle of incidence gets smaller due to the angle 144 with each reflection on any one of the mirrors 138, 140. The light beams 108 thus impinge on the mirrors 138, 140 at a steeper angle as the number of reflections increases until, at a point of reversal 142, the direction of the light beam 108 is reversed within the retroreflector 112 and the light beam 108 is reflected back to the beam input 114.

On its way from the point of reversal 142 to the beam input 114, the angle of incidence on the mirrors 138, 140 gets larger with each reflection on any one of the mirrors 138, 140. At the beam input 114, the light beam 108 is then emitted from the retroreflector 112. In the embodiment shown in FIG. 1, the beam input 114 and the beam output 116 are thus spatially coincident.

If the zig-zag-shaped reflections of the light beams 108 in this retroreflector 112 are regarded as a spatial wave, the frequency of this spatial wave increases up to the point of reversal and is then reduced again. Due to the only very small angle 144, a high number of reflections takes place so that the path length difference 156 can be adapted to the coherence length 154 by adjusting the angle 144.

If the angle of incidence of a light beam 108 at the beam input 114 is an integer multiple of the angle 144, the light beam 108 is retroreflected within the retroreflector 112 in a coincident manner. In one embodiment of the optical apparatus 100, all of the incident angles 120 of the light beams are thus integer multiples of the angle 144. The light beam 134, 108 incident into the retroreflector 112 is thus coincident with the retroreflected light beam 136, 108.

A beam splitter 130 in the illumination beam path 182 reflects the light beams 108, 136 coming from the beam output 116 to the light sheet optical system 122 while the light beams 108, 134 propagated in the direction of the beam input 114 pass through the beam splitter 130.

Due to the different reflection paths within the retroreflector 112 the light beams 108 incident into the light sheet optical system 122 are offset in time, or decoherent, as already explained above.

Figure 4:
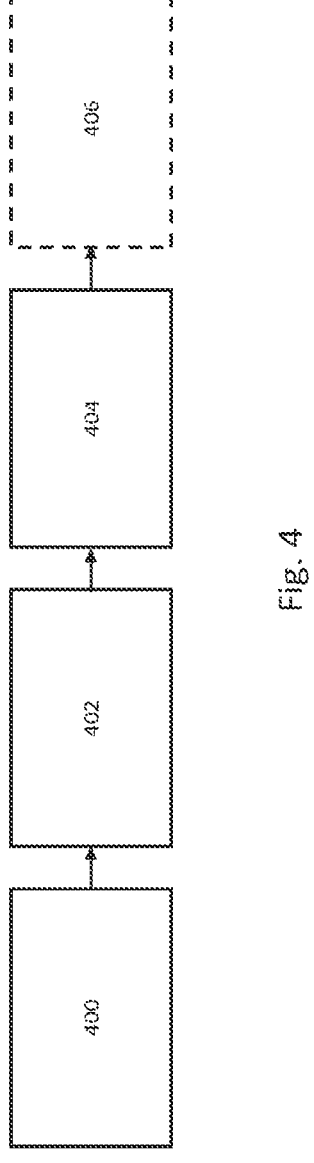
FIG. 4 is a schematic view of a flow chart for a method for producing light sheets.

According to FIG. 4, a plurality of collimated light pulses 158a, 158b, which converge on the common point 110, are coupled into the retroreflector 112 in a first step 400 for the production of light sheets. In step 401, the light pulses cover a path length 118 within the retroreflector 112 dependent on their angle of incidence 120.

Subsequently, they are coupled out of the retroreflector 112 in step 404 and each of them is transformed to a light sheet 102. In step 406, the light sheets 102 can be produced in a coplanar manner and having different propagation directions which intersect in a specimen volume 168.

The optical apparatus 100 can have an adjustment means 194 which is configured to vary the angle 144, or to tilt at least one of the mirrors 138, 140. The adjustment means 194 can include a drive element 196 acting on at least one of the mirrors 138, 140, such as a motor or an actuator, and a control means 198 controlling the drive element 196. The variation of the angle 144 allows, for example, to adjust the number of light sheets 102 or the path length difference 156.

The term "and/or" comprises all combinations of one or more of the associated elements indicated and can assume the form "/" in short.

Despite some aspects having been described in the context of an apparatus, it is clear that these aspects also refer to a description of the respective method, wherein a block or an apparatus corresponds to a method step or to a function of a method step. In analogy thereto, aspects described in the context of a method step also refer to a description of a corresponding block or element or a property of a corresponding apparatus.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

100 optical apparatus
102 light sheet
104 optical splitter system
106 output of optical splitter system
107 lens at output of optical splitter system
108 light beam
110 common point, on which light beams converge
112 retroreflector
114 beam input of retroreflector
116 beam output of retroreflector
118 path length of light beam within retroreflector
120 angle of incidence of light beam into retroreflector
122 light sheet optical system
126 propagation direction of light sheet
130 beam splitter
132 mirror surface
134 section of light beam
136 section of light beam
138 mirror
140 mirror
142 point of reversal
144 angle by which the mirrors are tilted with respect to each other
146 time offset
148 middle plane
150 back focal plane of light sheet objective or light sheet optical system
152 light source
154 coherence length
156 path length difference
158 input light pulse
158a, 158b light pulses generated from input light pulse
160 optical device for splitting up a light beam
162 lens assembly
163 cylindrical lens of lens assembly
164 cylindrical lens
166 objective
168 specimen volume
170 input light beam
180 light sheet microscope
182 illumination beam path
184 detector optical system
186 optical axis of detector optical system
188 optical axis of light sheet optical system
190 plane into which cylindrical lens focuses
192 volume between mirrors
194 adjustment device
196 drive element
198 control device
200 pupil
202 elliptical cross-section
300 plane of light beams
400 coupling-in of light beams
401 reflection of light beams dependent on angle of incidence
406 production of coplanar, intersecting light sheets

The invention claimed is:

1. An optical apparatus for production of light sheets, the optical apparatus comprising:

an optical splitter system configured to split an input light beam into a plurality of collimated light beams at an optical splitter system output thereof, the plurality of collimated light beams converging on a common point;

a retroreflector, comprising a beam input at which the plurality of collimated light beams is coupled into the retroreflector, and a beam output at which the plurality of collimated light beams is emitted from the retroreflector; and a light sheet optical system into which the plurality of collimated light beams emitted from the beam output of the retroreflector enters, wherein the light sheet optical system is configured to produce, from each respective collimated light beam of the plurality of collimated light beams, a differently oriented light sheet at a light sheet optical system output, wherein a respective path length covered within the retroreflector by each respective collimated light beam between the beam input and the beam output is dependent on a respective angle of incidence of each respective collimated light beam of the plurality of collimated light beams at the beam input.

2. The optical apparatus according to claim 1, wherein the plurality of collimated light beams have different path lengths within the retroreflector.

3. The optical apparatus according to claim 1, wherein the plurality of collimated light beams are situated in a single plane at least in sections between the optical splitter system and the light sheet optical system.

4. The optical apparatus according to claim 1, wherein a portion of the plurality of collimated light beams directed from the beam output to the light sheet optical system originates from the common point.

5. The optical apparatus according to claim 1, wherein the differently oriented light sheets produced from different collimated light beams have different propagation directions.

6. The optical apparatus according to claim 1, wherein the differently oriented light sheets are coplanar.

7. The optical apparatus according to claim 1, wherein the beam input and the beam output coincide.

8. The optical apparatus according to claim 1, wherein the common point is coincident with the beam input.

9. The optical apparatus according to claim 1, wherein, with at least some of the plurality of collimated light beams, a portion ending at the beam input of a single collimated light beam of the plurality of collimated light beams entering the retroreflector, and a portion beginning at the beam output of the single collimated light beam are coincident.

10. The optical apparatus according to claim 1, wherein the retroreflector comprises two mirrors tilted with respect to each other, and the plurality of collimated light beams has a point of reversal within the retroreflector at which a direction of the plurality of collimated light beams is reversed.

11. The optical apparatus according to claim 1, wherein the common point on which the plurality of collimated light beams converge lies in a back focal plane or a plane of the light sheet optical system optically conjugate thereto.

12. The optical apparatus according to claim 1, wherein light of the plurality of collimated light beams has a coherence length that is smaller than a shortest difference between the path lengths of the plurality of collimated light beams.

13. The optical apparatus according to claim 1, wherein the optical splitter system comprises an optical device which is configured to split up the input light beam into the plurality of collimated light beams.

14. The optical apparatus according to claim 13, wherein the optical device comprises a lens assembly comprising at least one cylindrical lens.

15. A light sheet microscope comprising an optical apparatus according to claim 1 in an illumination beam path.

16. A method of producing light sheets performed using the optical apparatus according to claim 1, wherein a plurality of collimated light pulses which converge on a common point are coupled into a retroreflector and cover a path length within the retroreflector dependent on an angle of incidence into the retroreflector before they are coupled out of the retroreflector and are each transformed into one light sheet.

\* \* \* \* \*